US012648052B2

(12) United States Patent
Chang et al.

(10) Patent No.: US 12,648,052 B2
(45) Date of Patent: Jun. 2, 2026

(54) AEROSOL DELIVERY DEVICE WITH RADIANT HEATING

(71) Applicant: RAI Strategic Holdings, Inc., Winston-Salem, NC (US)

(72) Inventors: Yi-ping Chang, Greensboro, NC (US); Michael F. Davis, Clemmons, NC (US); Stephen Benson Sears, Siler City, NC (US); Karen V. Taluskie, Winston-Salem, NC (US); Susan K. Pike, Ringgold, GA (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 233 days.

(21) Appl. No.: 17/411,658

(22) Filed: Aug. 25, 2021

(65) Prior Publication Data

US 2021/0385909 A1 Dec. 9, 2021

Related U.S. Application Data

(63) Continuation of application No. 14/808,450, filed on Jul. 24, 2015, now Pat. No. 11,134,544.

(51) Int. Cl.
*H05B 3/00* (2006.01)
*A24F 40/10* (2020.01)
(Continued)

(52) U.S. Cl.
CPC ........... *H05B 3/0033* (2013.01); *A24F 40/46* (2020.01); *H05B 1/0244* (2013.01); *A24F 40/10* (2020.01)

(58) Field of Classification Search
CPC .... A24F 47/008; A24F 47/004; A24F 47/002; A24F 47/00; A24F 40/00; A24F 40/44; A24F 40/46; H05B 1/0244
(Continued)

(56) References Cited

U.S. PATENT DOCUMENTS 1,771,366 A 7/1930 Wyss et al.
2,057,353 A 10/1936 Whittemore, Jr.
(Continued)

FOREIGN PATENT DOCUMENTS

AU 276250 7/1965
CA 2 641 869 5/2010
(Continued)

OTHER PUBLICATIONS

PH Notice of Allowance dated Jan. 25, 2024 from related PH Patent Application No. 1/2020/551778 filed Oct. 27, 2020; 2 pages.
(Continued)

*Primary Examiner* — Steven W Crabb
*Assistant Examiner* — Alba T Rosario-Aponte
(74) *Attorney, Agent, or Firm* — Womble Bond Dickinson (US) LLP

(57) ABSTRACT

The present disclosure relates to aerosol delivery devices, methods of forming such devices, and elements of such devices. In some embodiments, the present disclosure provides devices configured for vaporization of an aerosol precursor composition through radiant heating. The radiant heat source may be a laser diode or further element suitable for providing electromagnetic radiation, and heating may be carried out within a radiation-trapping chamber. In some embodiments, an interior of such chamber may be configured as a black body or as a white body.

30 Claims, 9 Drawing Sheets

(51) Int. Cl.
*A24F 40/46* (2020.01)
*H05B 1/02* (2006.01)

(58) Field of Classification Search
USPC ........................................ 392/395, 394, 386
See application file for complete search history.

(56) References Cited

U.S. PATENT DOCUMENTS 2,104,266 A 1/1938 McCormick
3,200,819 A 8/1965 Gilbert
3,651,240 A 3/1972 Kirkpatrick
4,284,089 A 8/1981 Ray
4,303,083 A 12/1981 Burruss, Jr.
4,640,233 A 2/1987 Draper et al.
4,735,217 A 4/1988 Gerth et al.
4,848,374 A 7/1989 Chard et al.
4,907,606 A 3/1990 Lilja et al.
4,922,901 A 5/1990 Brooks et al.
4,945,931 A 8/1990 Gori
4,947,874 A 8/1990 Brooks et al.
4,947,875 A 8/1990 Brooks et al.
4,986,286 A 1/1991 Roberts et al.
5,019,122 A 5/1991 Clearman et al.
5,042,510 A 8/1991 Curtiss et al.
5,060,671 A 10/1991 Counts et al.
5,093,894 A 3/1992 Deevi et al.
5,144,962 A 9/1992 Counts et al.
5,154,192 A 10/1992 Sprinkel et al.
5,249,586 A 10/1993 Morgan et al.
5,261,424 A 11/1993 Sprinkel, Jr.
5,264,681 A 11/1993 Nozaki et al.
5,322,075 A 6/1994 Deevi et al.
5,353,813 A 10/1994 Deevi et al.
5,369,723 A 11/1994 Counts et al.
5,372,148 A 12/1994 McCafferty et al.
5,388,574 A 2/1995 Ingebrethsen et al.
5,408,574 A 4/1995 Deevi et al.
5,468,936 A 11/1995 Deevi et al.
5,498,850 A 3/1996 Das
5,515,842 A 5/1996 Ramseyer et al.
5,530,225 A 6/1996 Hajaligol
5,564,442 A 10/1996 MacDonald et al.
5,649,554 A 7/1997 Sprinkel et al.
5,666,977 A 9/1997 Higgins et al.
5,687,746 A 11/1997 Rose et al.
5,726,421 A 3/1998 Fleischhauer et al.
5,727,571 A 3/1998 Meiring et al.
5,743,251 A 4/1998 Howell et al.
5,799,663 A 9/1998 Gross et al.
5,819,756 A 10/1998 Mielordt
5,865,185 A 2/1999 Collins et al.
5,865,186 A 2/1999 Volsey, II
5,878,752 A 3/1999 Adams et al.
5,894,841 A 4/1999 Voges
5,934,289 A * 8/1999 Watkins .................. A24F 40/53
131/194
5,954,979 A 9/1999 Counts et al.
5,967,148 A 10/1999 Harris et al.
6,040,560 A 3/2000 Fleischhauer
6,053,176 A 4/2000 Adams et al.
6,089,857 A 7/2000 Matsuura et al.
6,095,153 A 8/2000 Kessler et al.
6,125,853 A 10/2000 Susa et al.
6,155,268 A 12/2000 Takeuchi
6,164,287 A 12/2000 White
6,196,218 B1 3/2001 Voges
6,196,219 B1 3/2001 Hess et al.
6,580,875 B2 6/2003 Rymer
6,598,607 B2 7/2003 Adiga et al.
6,601,776 B1 8/2003 Oljaca et al.
6,615,840 B1 9/2003 Fournier et al.
6,688,313 B2 2/2004 Wrenn et al.
6,772,756 B2 8/2004 Shayan
6,803,545 B2 10/2004 Blake et al.
6,854,461 B2 2/2005 Nichols
6,854,470 B1 2/2005 Pu
7,040,314 B2 5/2006 Nguyen et al.
7,117,867 B2 10/2006 Cox et al.
7,217,320 B2 5/2007 Kim et al.
7,293,565 B2 11/2007 Griffin et al.
7,513,253 B2 4/2009 Kobayashi et al.
7,726,320 B2 6/2010 Robinson et al.
7,775,459 B2 8/2010 Martens, III et al.
7,832,410 B2 11/2010 Hon
7,845,359 B2 12/2010 Montaser
7,896,006 B2 3/2011 Hamano et al.
8,127,772 B2 3/2012 Montaser
8,190,006 B2 5/2012 Wendt
8,205,622 B2 6/2012 Pan
8,314,591 B2 11/2012 Terry et al.
8,365,742 B2 2/2013 Hon
8,402,976 B2 3/2013 Fernando et al.
RE44,312 E 6/2013 Vieira
8,499,766 B1 8/2013 Newton
8,528,569 B1 9/2013 Newton
8,539,959 B1 9/2013 Scatterday
8,550,069 B2 10/2013 Alelov
8,873,941 B2 10/2014 Row et al.
8,910,640 B2 12/2014 Sears et al.
9,744,320 B2 8/2017 Wakalopulos
11,134,544 B2 * 9/2021 Chang ..................... A24F 40/46
11,241,042 B2 2/2022 Hatrick et al.
2002/0078946 A1 6/2002 Sprinkel, Jr. et al.
2002/0146242 A1 10/2002 Vieira
2002/0181946 A1 12/2002 Brown et al.
2003/0007787 A1 1/2003 Rymer
2003/0226837 A1 12/2003 Blake et al.
2004/0118401 A1 6/2004 Smith et al.
2004/0129280 A1 7/2004 Woodson et al.
2004/0170405 A1 9/2004 Sherwood et al.
2004/0200488 A1 10/2004 Felter et al.
2004/0226568 A1 11/2004 Takeuchi et al.
2005/0016550 A1 1/2005 Katase
2005/0126562 A1 6/2005 Rabinowitz et al.
2006/0016453 A1 1/2006 Kim
2006/0196518 A1 9/2006 Hon
2007/0074734 A1 4/2007 Braunshteyn et al.
2007/0102013 A1 5/2007 Adams et al.
2007/0215167 A1 9/2007 Crooks et al.
2008/0085103 A1 4/2008 Beland et al.
2008/0092912 A1 4/2008 Robinson et al.
2008/0257367 A1 10/2008 Paterno et al.
2008/0271732 A1 11/2008 Weaver et al.
2008/0276947 A1 11/2008 Martzel
2008/0302374 A1 12/2008 Wengert et al.
2009/0095311 A1 4/2009 Hon
2009/0095312 A1 4/2009 Herbrich et al.
2009/0126745 A1 5/2009 Hon
2009/0188490 A1 7/2009 Hon
2009/0230117 A1 9/2009 Fernando et al.
2009/0272379 A1 11/2009 Thorens et al.
2009/0283103 A1 11/2009 Nielsen et al.
2009/0320863 A1 12/2009 Fernando et al.
2010/0031968 A1 2/2010 Sheikh et al.
2010/0043809 A1 2/2010 Magnon
2010/0083959 A1 4/2010 Siller
2010/0163063 A1 7/2010 Fernando et al.
2010/0200006 A1 8/2010 Robinson et al.
2010/0229881 A1 9/2010 Hearn
2010/0242974 A1 9/2010 Pan
2010/0307518 A1 12/2010 Wang
2010/0313901 A1 12/2010 Fernando et al.
2010/0319716 A1 * 12/2010 Tao ......................... F23Q 13/00
131/173
2011/0005535 A1 1/2011 Xiu
2011/0011396 A1 1/2011 Fang
2011/0036363 A1 2/2011 Urtsev et al.
2011/0036365 A1 2/2011 Chong et al.
2011/0094523 A1 4/2011 Thorens et al.
2011/0126848 A1 6/2011 Zuber et al.
2011/0155153 A1 6/2011 Thorens et al.
2011/0155718 A1 6/2011 Greim et al.
2011/0168194 A1 7/2011 Hon
2011/0226266 A1 9/2011 Tao

(56) References Cited

U.S. PATENT DOCUMENTS

2011/0265806 A1 11/2011 Alarcon et al.
2011/0290248 A1 12/2011 Schennum
2011/0309157 A1 12/2011 Yang et al.
2012/0042885 A1 2/2012 Stone et al.
2012/0060853 A1 3/2012 Robinson et al.
2012/0111347 A1 5/2012 Hon
2012/0132643 A1 5/2012 Choi et al.
2012/0227752 A1 9/2012 Alelov
2012/0231464 A1 9/2012 Yu et al.
2012/0260927 A1 10/2012 Liu
2012/0279512 A1 11/2012 Hon
2012/0318882 A1 12/2012 Abehasera
2013/0008457 A1 1/2013 Zheng et al.
2013/0037041 A1 2/2013 Worm et al.
2013/0056013 A1 3/2013 Terry et al.
2013/0081625 A1 4/2013 Rustad et al.
2013/0081642 A1 4/2013 Safari
2013/0180553 A1 7/2013 Kim et al.
2013/0192619 A1 8/2013 Tucker et al.
2013/0192623 A1* 8/2013 Tucker ................... H01C 17/00 131/329
2013/0213417 A1 8/2013 Chong et al.
2013/0255702 A1 10/2013 Griffith, Jr. et al.
2013/0298905 A1 11/2013 Leven et al.
2013/0306084 A1 11/2013 Flick
2013/0319439 A1 12/2013 Gorelick et al.
2013/0340750 A1 12/2013 Thorens et al.
2013/0340775 A1 12/2013 Juster et al.
2014/0000638 A1 1/2014 Sebastian et al.
2014/0059780 A1 3/2014 Lafleche et al.
2014/0060554 A1 3/2014 Collett et al.
2014/0060555 A1 3/2014 Chang et al.
2014/0096781 A1 4/2014 Sears et al.
2014/0096782 A1 4/2014 Ampolini et al.
2014/0109921 A1 4/2014 Chen
2014/0157583 A1 6/2014 Ward et al.
2014/0209105 A1 7/2014 Sears et al.
2014/0238396 A1 8/2014 Bucherger
2014/0238424 A1 8/2014 Macko et al.
2014/0253144 A1 9/2014 Novak et al.
2014/0261408 A1 9/2014 DePiano et al.
2014/0261486 A1 9/2014 Potter et al.
2014/0261487 A1 9/2014 Chapman et al.
2014/0261495 A1 9/2014 Novak, III et al.
2014/0270727 A1 9/2014 Ampolini et al.
2014/0270729 A1 9/2014 DePiano et al.
2014/0270730 A1 9/2014 DePiano et al.
2014/0305454 A1 10/2014 Rinker et al.
2014/0334802 A1 11/2014 Dubief
2014/0345631 A1 11/2014 Bowen et al.
2015/0020823 A1 1/2015 Lipowicz et al.
2015/0020830 A1 1/2015 Koller
2015/0053217 A1 2/2015 Steingraber et al.
2015/0068541 A1 3/2015 Sears et al.
2015/0078735 A1 3/2015 Cormack
2015/0090279 A1 4/2015 Chen
2015/0136158 A1 5/2015 Stevens et al.
2015/0164147 A1* 6/2015 Verleur ................... A24F 40/46 392/390
2015/0305409 A1 10/2015 Verleur et al.
2015/0320116 A1 11/2015 Bleloch et al.
2015/0351456 A1* 12/2015 Johnson .................. A24F 40/30 131/329
2016/0044962 A1 2/2016 Thorens et al.
2016/0089508 A1 3/2016 Smith et al.
2016/0120229 A1 5/2016 Tucker et al.
2016/0135505 A1 5/2016 Li et al.
2016/0338407 A1 11/2016 Kerdemelidis
2017/0251719 A1* 9/2017 Cyphert .................... A24F 1/00
2017/0303586 A1 10/2017 Sur
2017/0303592 A1 10/2017 Cameron et al.
2019/0029318 A1* 1/2019 Schneider ............... A24F 40/40

FOREIGN PATENT DOCUMENTS

| | | |
|---|---|---|
| CN | 1541577 | 11/2004 |
| CN | 2719043 | 8/2005 |
| CN | 200997909 | 1/2008 |
| CN | 101116542 | 2/2008 |
| CN | 101176805 | 5/2008 |
| CN | 201379072 | 1/2010 |
| CN | 102264251 A | 11/2011 |
| CN | 103763953 A | 4/2014 |
| CN | 203646497 | 6/2014 |
| CN | 104522892 | 4/2015 |
| CN | 104540406 A | 4/2015 |
| CN | 104619202 A | 5/2015 |
| CN | 104643290 | 5/2015 |
| CN | 204317492 | 5/2015 |
| DE | 10 2006 004 484 | 8/2007 |
| DE | 102006041042 | 3/2008 |
| DE | 20 2009 010 400 | 11/2009 |
| EP | 0 295 122 | 12/1988 |
| EP | 0 430 566 | 6/1991 |
| EP | 0 845 220 | 6/1998 |
| EP | 0 893 071 | 1/1999 |
| EP | 1 618 803 | 1/2006 |
| EP | 2 316 286 | 5/2011 |
| GB | 2469850 | 11/2010 |
| WO | WO 1997/48293 | 12/1997 |
| WO | WO 2003/034847 | 5/2003 |
| WO | WO 2004/043175 | 5/2004 |
| WO | WO 2004/080216 | 9/2004 |
| WO | WO2005/061033 A1 | 7/2005 |
| WO | WO 2005/099494 | 10/2005 |
| WO | WO 2007/078273 | 7/2007 |
| WO | WO 2007/131449 | 11/2007 |
| WO | WO 2009/105919 | 9/2009 |
| WO | WO 2009/155734 | 12/2009 |
| WO | WO 2010/003480 | 1/2010 |
| WO | WO 2010/045670 | 4/2010 |
| WO | WO 2010/073122 | 7/2010 |
| WO | WO 2010/118644 | 10/2010 |
| WO | WO 2010/140937 | 12/2010 |
| WO | WO 2011/010334 | 1/2011 |
| WO | WO 2012/072762 | 6/2012 |
| WO | WO 2012/100523 | 8/2012 |
| WO | 2013/034460 A1 | 3/2013 |
| WO | WO2013/083638 A1 | 6/2013 |
| WO | WO 2013/089551 | 6/2013 |
| WO | WO2013/116572 | 8/2013 |
| WO | WO2014/110119 A1 | 7/2014 |
| WO | WO 2014/182736 | 11/2014 |
| WO | 2015062983 A2 | 5/2015 |
| WO | WO2015/073854 A2 | 5/2015 |
| WO | WO2015/108816 A2 | 7/2015 |

OTHER PUBLICATIONS

CN Office Action dated Aug. 31, 2023 from related CNP Patent Application No. 202010471209.1 filed May 28, 2020; 23 pages (includes Engl transl).

* cited by examiner

AEROSOL DELIVERY DEVICE WITH RADIANT HEATING

CROSS-REFERENCE TO RELATED APPLICATIONS

The present application is a continuation of U.S. patent application Ser. No. 14/808,450, filed Jul. 24, 2015, which is incorporated by reference herein in its entirety.

FIELD OF THE DISCLOSURE

The present disclosure relates to aerosol delivery devices such as smoking articles, and more particularly to aerosol delivery devices that may utilize electrically generated heat for the production of aerosol (e.g., smoking articles commonly referred to as electronic cigarettes). The smoking articles may be configured to heat an aerosol precursor, which may incorporate materials that may be made or derived from tobacco or otherwise incorporate tobacco, the precursor being capable of forming an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices, and heat generating sources set forth in the background art described in U.S. Pat. No. 7,726,320 to Robinson et al., U.S. Pat. Pub. No. 2013/0255702 to Griffith Jr. et al., and U.S. Pat. Pub. No. 2014/0096781 to Sears et al., which are incorporated herein by reference in their entirety. See also, for example, the various types of smoking articles, aerosol delivery devices, and electrically powered heat generating sources referenced by brand name and commercial source in U.S. patent application Ser. No. 14/170,838 to Bless et al., filed Feb. 3, 2014, which is incorporated herein by reference in its entirety.

It would be desirable to provide a reservoir for an aerosol precursor composition for use in an aerosol delivery device, the reservoir being provided so as to improve formation of the aerosol delivery device. It would also be desirable to provide aerosol delivery devices that are prepared utilizing such reservoirs.

SUMMARY OF THE DISCLOSURE

The present disclosure relates to aerosol delivery devices, methods of forming such devices, and elements of such devices. The aerosol delivery devices can provide for improved heating of aerosol precursor compositions through utilization of radiant heating and/or through utilization of focused heating. Configurations of aerosol delivery devices that utilize radiant heating can be particularly beneficial in that there can be little to no charring of a wick that is being heated to vaporize a liquid transported thereby. Use of radiant heating also can significantly increase the usable lifetime of a heater and/or wick in an aerosol delivery device. Furthermore, radiant heating can be beneficial in reducing and/or eliminating any thermal degradation components formed by heating of an aerosol precursor liquid. Radiant heating likewise can mitigate or eliminate problems in known aerosol forming devices, such as pyrolysis and/or deposition of char at the interface between a wick and a heating wire wrapped around the wick.

In some embodiments, the devices can include a chamber that is configured for trapping electromagnetic radiation that may be delivered therein. The chamber may provide for trapping of the radiation at least in part due to the configuration of an interior surface of a wall of the chamber. In some embodiments, the devices can include a heater that provides focused heating, such as a laser diode. Preferably, a laser diode can be configured to deliver electromagnetic radiation at a specific wavelength or band of wavelengths that can be tuned for vaporization of the aerosol precursor composition and/or tuned for heating a wick or similar element via which the aerosol precursor composition may be provided for vaporization. The laser diode can particularly be positioned so as to deliver the electromagnetic radiation within a chamber, and the chamber may be configured to be radiation-trapping. Although laser diodes may be preferred, other heat sources, including resistive heating wires, microheaters, or the like, may be utilized. The combination of a chamber and a heater, such as a laser diode, may form an atomizer, and the atomizer also may include a wick or like element. The atomizer may be positioned within an outer shell, which may define the aerosol delivery device. Such outer shell may include all elements necessary for forming the aerosol delivery device. In some embodiments, the outer shell may be combined with a control body, which itself may include a housing that includes elements, such as a power source, a microcontroller, a sensor, and an output (e.g., a light emitting diode (LED), haptic feedback element, or the like).

In some embodiments, an aerosol delivery device according to the present disclosure can comprise an outer shell, a radiation-trapping chamber positioned within the outer shell and comprising a chamber wall, and a radiation source configured to provide radiation within the radiation-trapping chamber. The aerosol delivery device may be defined by one or more further characteristics, the following statements being exemplary thereof and being combinable in any manner.

The radiation-trapping chamber in the aerosol delivery device can be substantially spherical.

The radiation-trapping chamber in the aerosol delivery device can be substantially elongated (e.g., substantially tubular).

An interior of the radiation-trapping chamber (e.g., an interior surface of the wall forming the chamber or a surface of a wall within the chamber) can be configured to one or more of absorb, emit, and reflect radiation from the radiation source.

The interior of the radiation-trapping chamber can be configured as a black body.

The interior of the radiation-trapping chamber can be configured as a white body.

The radiation-trapping chamber can comprise an inlet and an outlet in fluid communication.

The radiation source can be positioned on the chamber wall of the radiation-trapping chamber.

The radiation source can be positioned within the radiation-trapping chamber and spaced apart from the chamber wall.

The radiation source can extend substantially along a longitudinal axis of the aerosol delivery device, particularly so as to be substantially parallel with the longitudinal axis.

The radiation source can comprise a laser diode.

The radiation source can be configured to emit electromagnetic radiation with a wavelength in the range of about 390 nm to about 1 mm.

The radiation source can be configured to emit electromagnetic radiation with a wavelength in the range of visible light.

The radiation source can be configured to emit electromagnetic radiation with a wavelength in the range of violet light to far infrared light.

The radiation source can be configured to emit electromagnetic radiation within a wavelength band having a bandwidth that is no greater than 1,000 nm, that is no greater than 500 nm, that is no greater than 250 nm, that is no greater than 100 nm, that is no greater than 50 nm, that is no greater than 10 nm, that is no greater than 5 nm, or that is no greater than 2 nm.

The aerosol delivery device can comprise a wick configured to deliver an aerosol precursor composition within the radiation-trapping chamber.

The wick can pass through at least one aperture in the chamber wall of the radiation-trapping chamber such that a first section of the wick is positioned exterior to the radiation-trapping chamber and a second section of the wick is positioned interior to the radiation-trapping chamber. The second section of the wick can be a vaporization section, and the first section of the wick can be a transport section. The first section of the wick may define arms that extend away from the second section of the wick.

The radiation source can be in contact with at least a portion of the second section of the wick.

The second section of the wick can be positioned substantially perpendicular to a longitudinal axis of the outer shell.

The wick can be configured as a layer lining at least a portion of an interior of the chamber wall of the radiation-trapping chamber.

The chamber wall of the radiation-trapping chamber can comprise a channel extending therethrough, and a portion of the wick can be extending through the channel.

The outer shell can comprise an air entry and can comprise a mouthend with an aerosol port.

The aerosol delivery device can comprise an air path therethrough defined at one end by the air entry and at the opposing end by the aerosol port. The air path can extend through the radiation-trapping chamber. The air path can be substantially a straight line.

The aerosol delivery device can comprise one or more of an electrical power source, a pressure sensor, and a microcontroller.

One or more of the electrical power source, the pressure sensor, and the microcontroller can be positioned within a control housing that is connectable with the outer shell.

In some embodiments, an aerosol delivery device according to the present disclosure can comprise an outer shell and a heater configured for vaporizing an aerosol precursor composition, the heater comprising a laser diode. The aerosol delivery device may be defined by one or more further characteristics, the following statements being exemplary thereof and being combinable in any manner.

The aerosol delivery device can comprise one or more of an electrical power source, a pressure sensor, and a microcontroller.

One or more of the electrical power source, the pressure sensor, and the microcontroller can be positioned within a control housing that is connectable with the outer shell.

The outer shell can comprise an air entry and can comprise a mouthend with an aerosol port.

The aerosol delivery device can comprise an air path therethrough defined at one end by the air entry and at the opposing end by the aerosol port. The air path can be substantially a straight line.

The aerosol delivery device can comprise a wick configured to deliver the aerosol precursor composition from a reservoir to be in a vaporizing arrangement with the heater.

The aerosol delivery device can comprise a radiation-trapping chamber with a chamber wall, wherein the heater is positioned within the radiation-trapping chamber. The heater can be positioned on or in the chamber wall. The heater can be positioned away from the chamber wall.

The wick can pass through at least one aperture in the chamber wall of the radiation-trapping chamber such that a first section of the wick is positioned exterior to the radiation-trapping chamber and a second section of the wick is positioned interior to the radiation-trapping chamber.

The wick can be configured as a layer lining at least a portion of an interior of the chamber wall of the radiation-trapping chamber.

The radiation-trapping chamber can be substantially spherical.

The radiation-trapping chamber can be substantially elongated (e.g., substantially tubular).

An interior of the radiation-trapping chamber (e.g., an interior surface of the wall forming the chamber or a surface of a wall within the chamber) can be configured to one or more of absorb, emit, and reflect radiation from the radiation source.

The interior of the radiation-trapping chamber can be configured as a black body.

The interior of the radiation-trapping chamber can be configured as a white body.

In some embodiments, the present disclosure can provide an atomizer for an aerosol delivery device. In particular, the atomizer can comprise a radiation-trapping chamber formed of a chamber wall, a radiation source positioned within the radiation-trapping chamber, and a wick, at least a portion of which is positioned within the radiation-trapping chamber so as to be in a vaporizing arrangement with the heater. The atomizer may be defined by one or more further characteristics, the following statements being exemplary thereof and being combinable in any manner.

The radiation-trapping chamber can be substantially spherical.

The radiation-trapping chamber can be substantially elongated (e.g., may be substantially tubular).

An interior of the radiation-trapping chamber (e.g., an interior surface of the wall forming the chamber or a surface of a wall within the chamber) can be configured to one or more of absorb, emit, and reflect radiation from the radiation source.

The interior of the radiation-trapping chamber can be configured as a black body.

The interior of the radiation-trapping chamber can be configured as a white body.

The radiation source can comprise a laser diode.

The radiation source can comprise a resistive heating wire.

In some embodiments, the present disclosure can relate to methods of forming an aerosol delivery device. For example, such method can comprise inserting an atomizer into an outer shell, the atomizer comprising a radiation-trapping chamber and a heater configured to provide electromagnetic radiation. The atomizer further can comprise a wick, which may pass through an aperture into the radiation-trapping chamber and/or which may substantially line an interior surface of the chamber, such as an interior surface of the wall forming the radiation-trapping chamber. The method can comprise establishing an electrical connection between the heater and one or more electrical contacts. The electrical contacts may be configured to provide electrical connection between the heater and a power source, which may be positioned within the outer shell or may be positioned within a separate control body, which may be connectable to the outer shell so as to form the electrical connection. The method may comprise inserting a reservoir within the outer shell such that the wick is in fluid communication with an aerosol precursor composition stored within the reservoir.

BRIEF DESCRIPTION OF THE FIGURES

Figure 1:
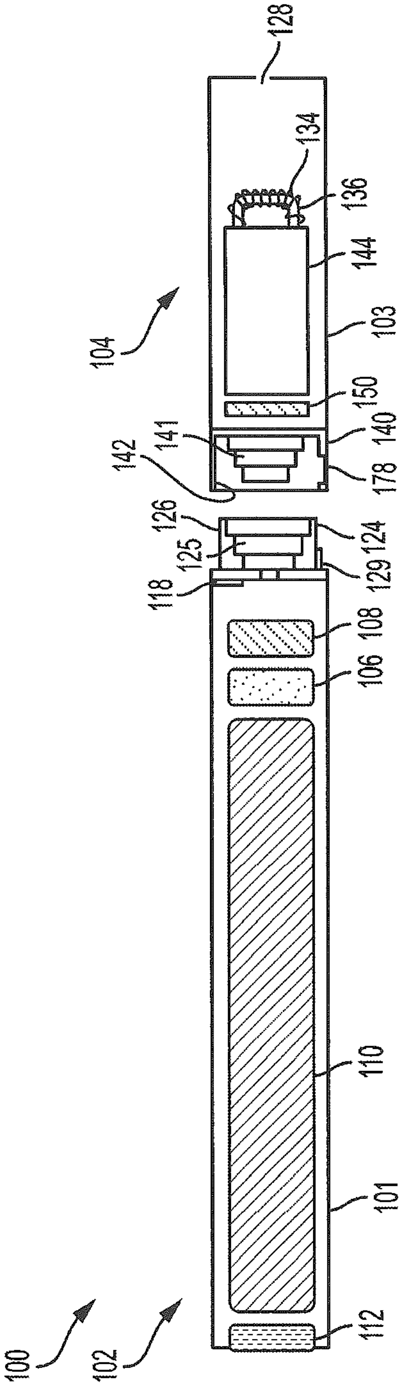
Figure 2A:
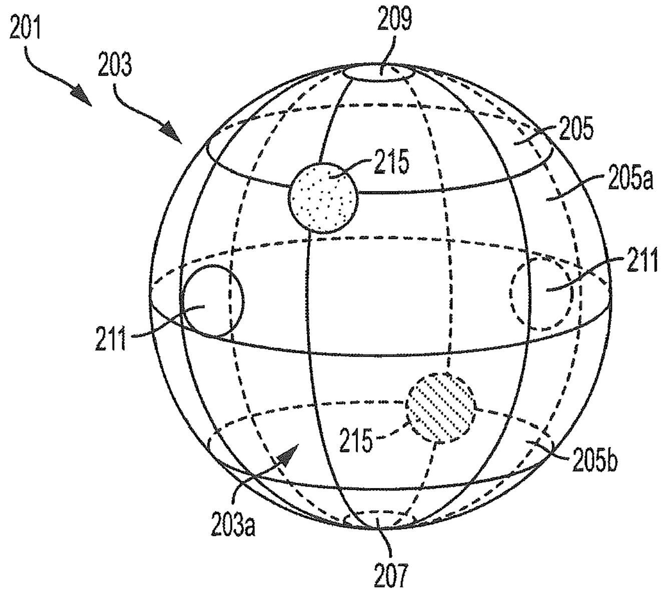
Figure 2B:
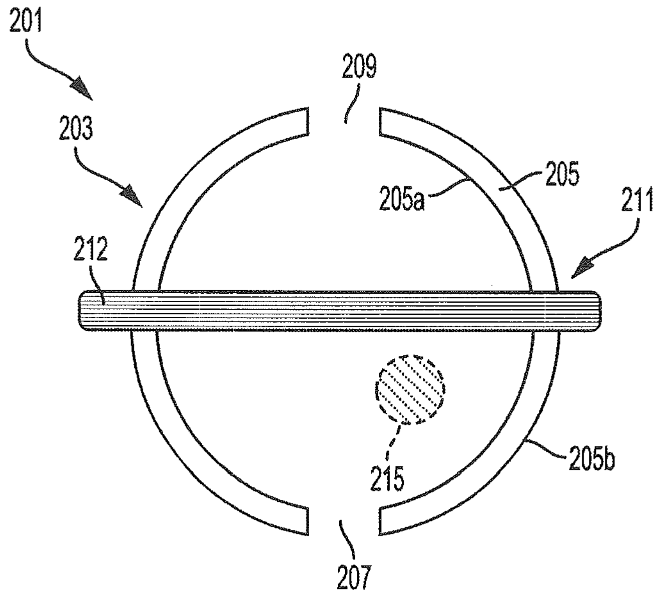
Figure 2C:
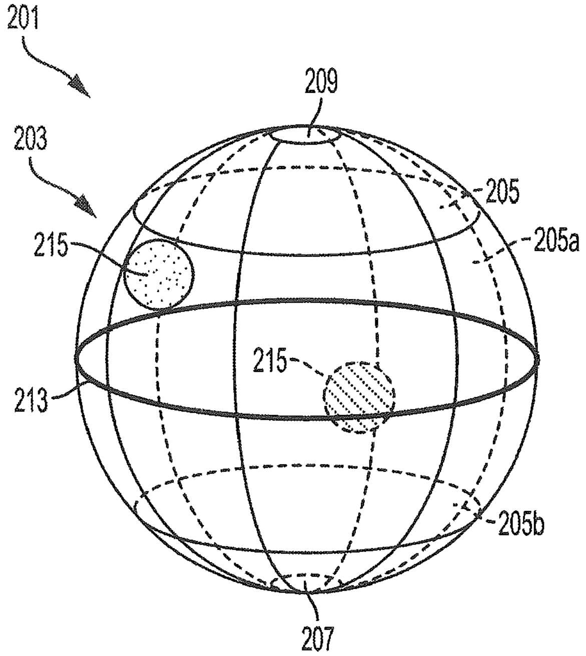
Figure 2D:
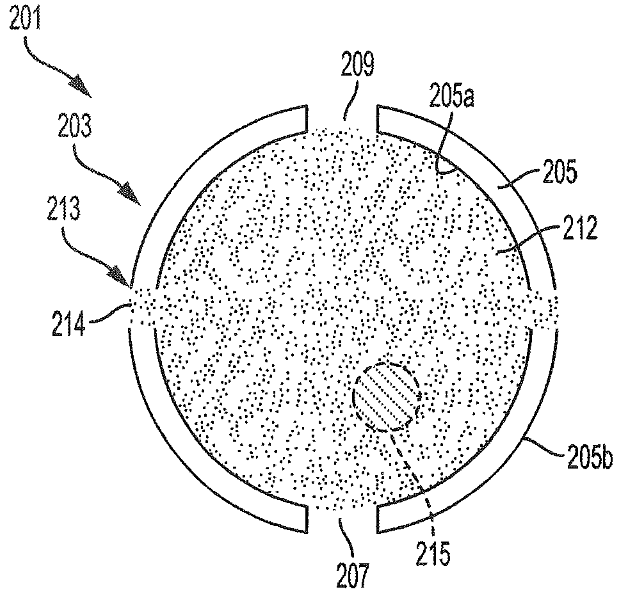
Figure 3:
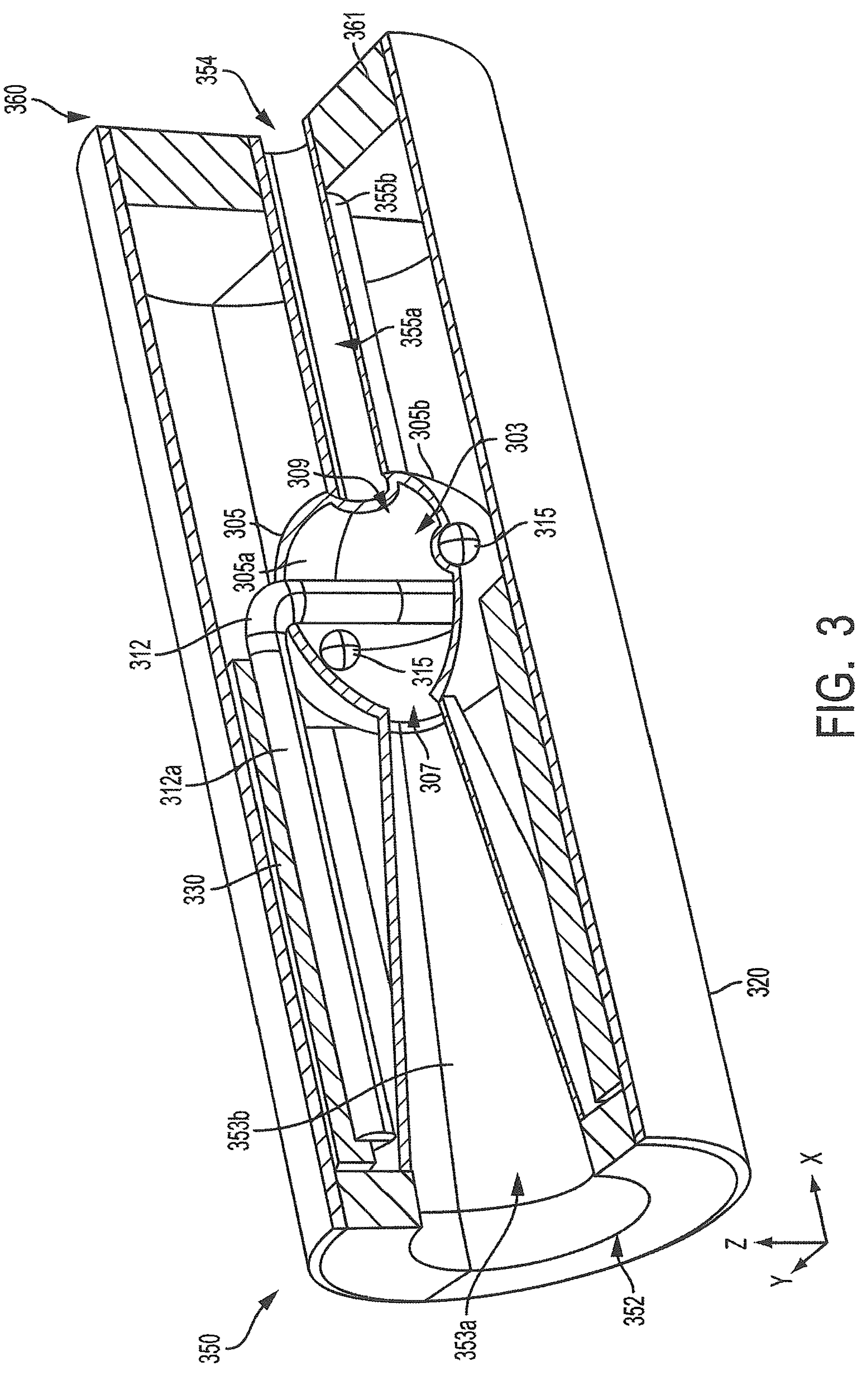
Figure 3A:
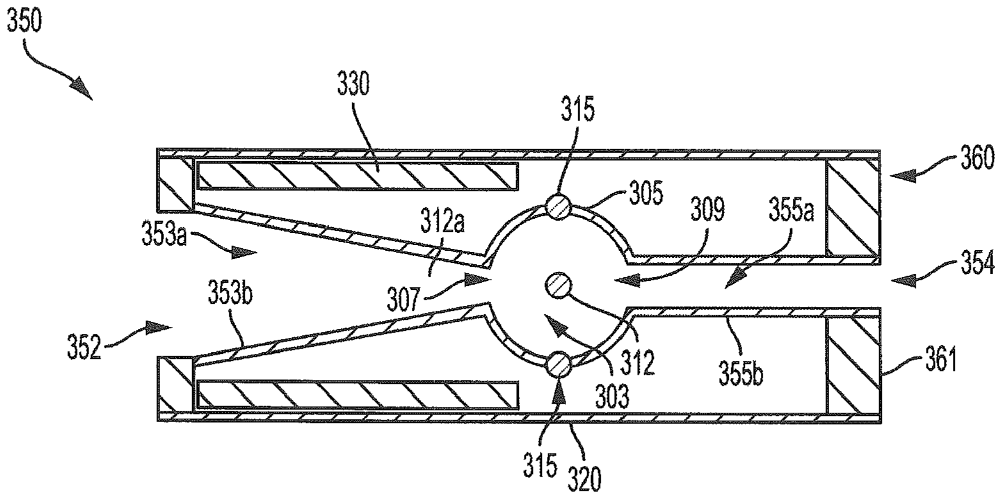
Figure 3B:
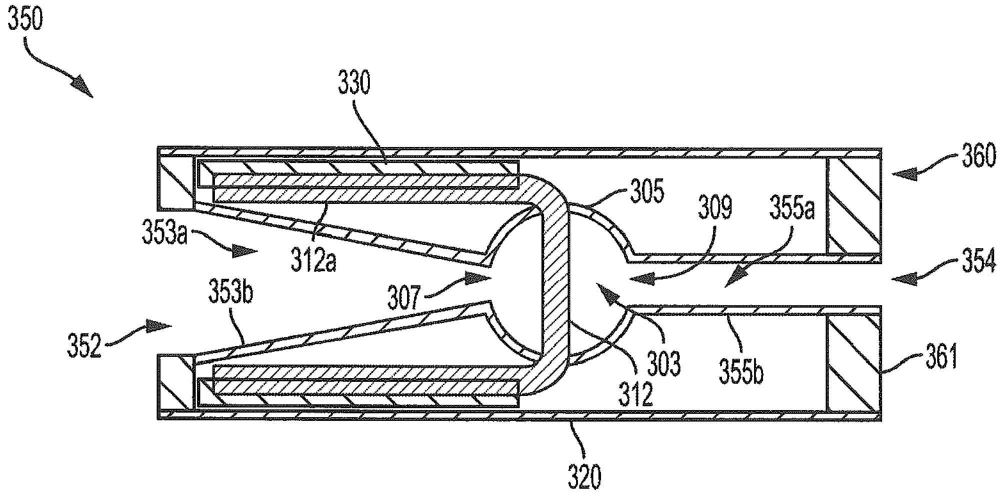
Figure 4:
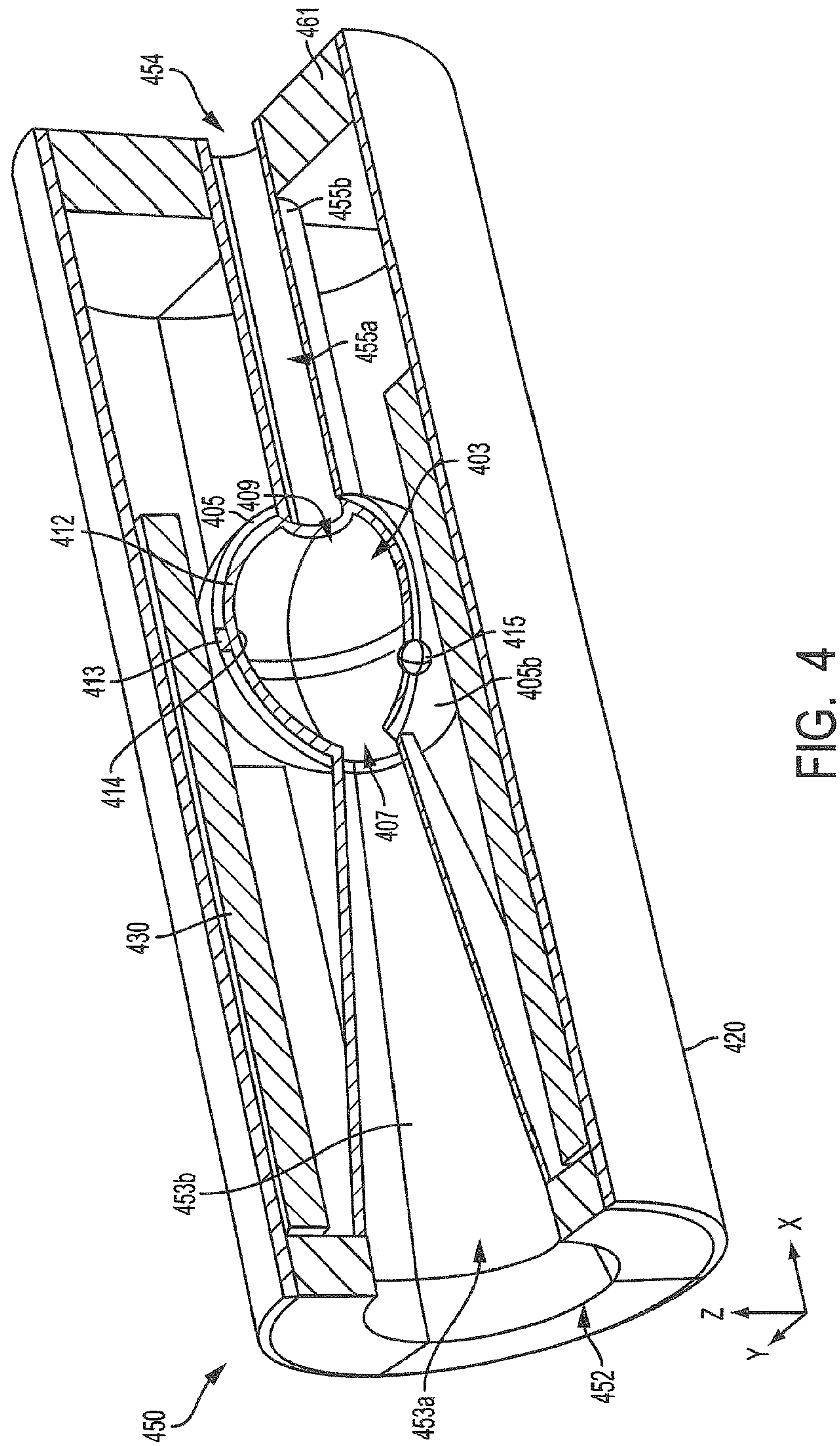
Figure 5:
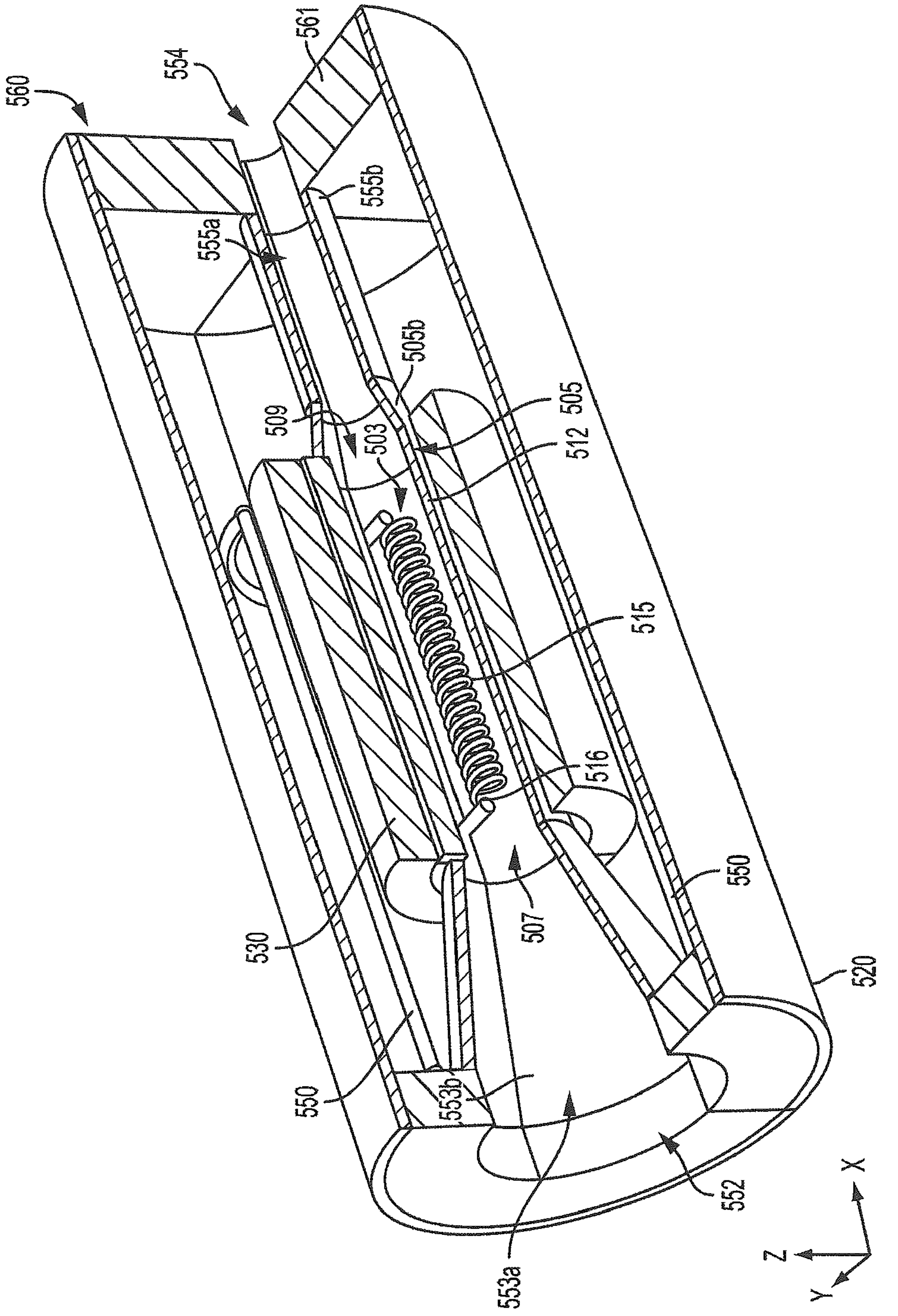
Figure 5A:
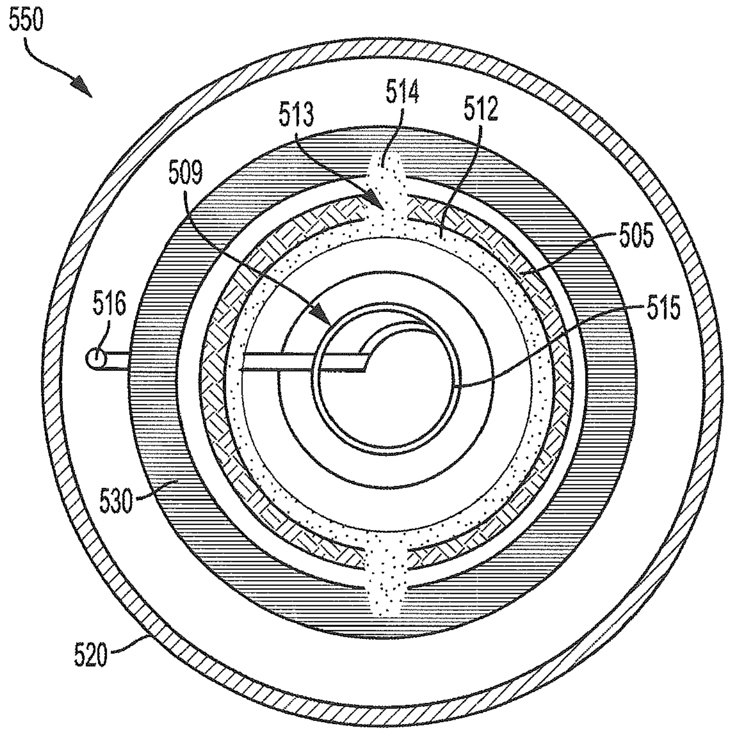
Figure 6:
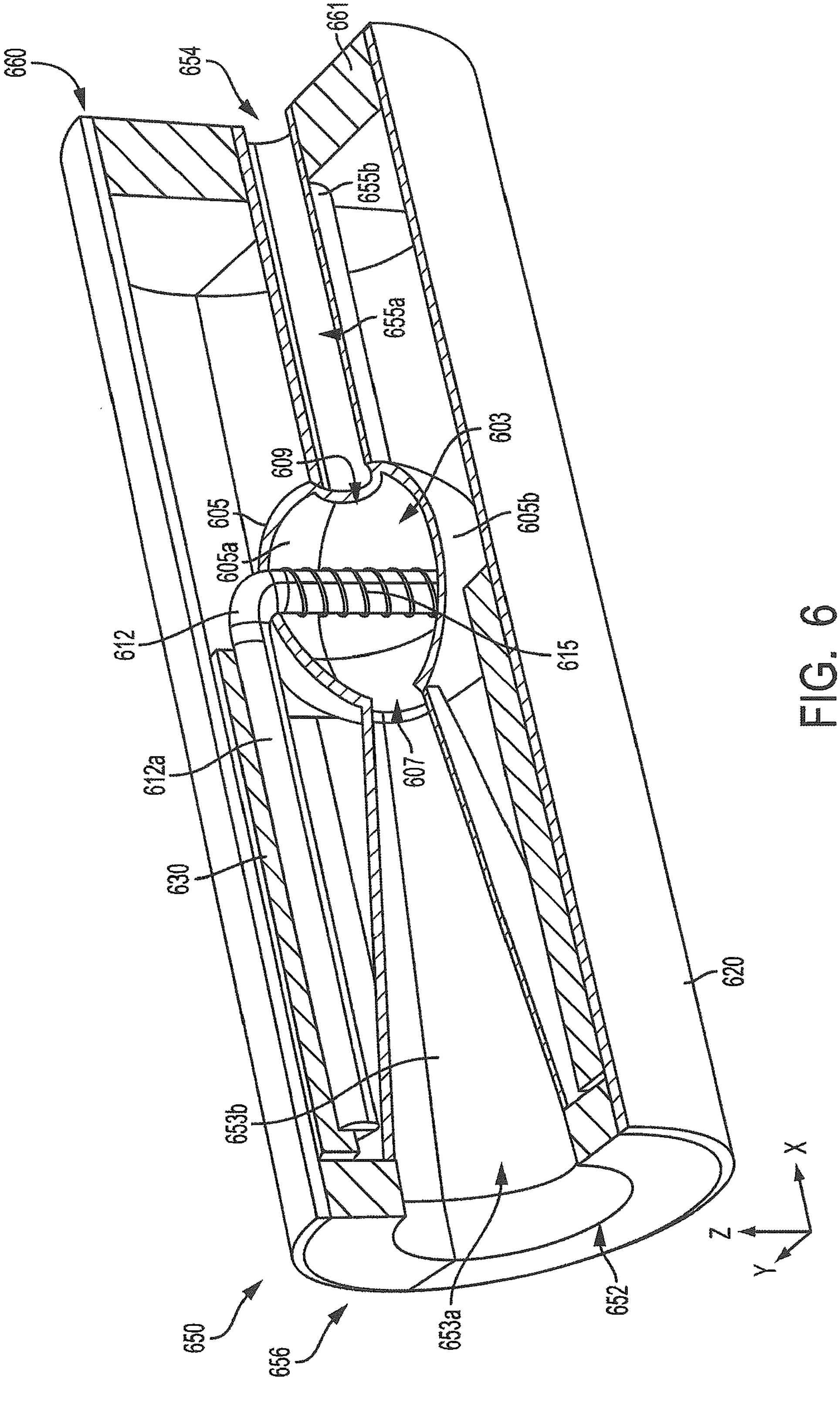

Having thus described the disclosure in the foregoing general terms, reference will now be made to the accompanying drawings, which are not necessarily drawn to scale, and wherein:

FIG. 1 is a partially cut-away view of an aerosol delivery device comprising a cartridge and a control body including a variety of elements that may be utilized in an aerosol delivery device according to various embodiments of the present disclosure;

FIG. 2*a* is a partially transparent view of a radiation-trapping chamber with wick apertures for use as an atomizer according to example embodiments of the present disclosure;

FIG. 2*b* is a cross-sectional view of an atomizer according to example embodiments of the present disclosure including a radiation-trapping chamber, a radiation source, and a wick;

FIG. 2*c* is a partially transparent view of a radiation-trapping chamber with a channel therein for use as an atomizer according to example embodiments of the present disclosure;

FIG. 2*d* is a cross-sectional view of an atomizer according to example embodiments of the present disclosure including a radiation-trapping chamber, a radiation source, and a wick;

FIG. 3 is a partially cut away, perspective view of an aerosol delivery device according to an example embodiments of the present disclosure;

FIG. 3*a* is a cross-sectional view through the xy plane of the aerosol delivery device illustrated in FIG. 3;

FIG. 3*b* is a cross-sectional view through the xz plane of the aerosol delivery device illustrated in FIG. 3;

FIG. 4 is a partially cut away, perspective view of a further aerosol delivery device according to example embodiments of the present disclosure;

FIG. 5 is a partially cut away, perspective view of yet another aerosol delivery device according to example embodiments of the present disclosure;

FIG. 5*a* is a cross-sectional view through the yz plane of the aerosol delivery device illustrate in FIG. 5; and FIG. 6 is a partially cut away, perspective view of still another aerosol delivery device according to example embodiments of the present disclosure.

DETAILED DESCRIPTION

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

As described hereinafter, embodiments of the present disclosure relate to aerosol delivery systems. Aerosol delivery systems according to the present disclosure use electrical energy to heat a material (preferably without combusting the material to any significant degree and/or without significant chemical alteration of the material) to form an inhalable substance; and components of such systems have the form of articles that most preferably are sufficiently compact to be considered hand-held devices. That is, use of components of preferred aerosol delivery systems does not result in the production of smoke—i.e., from by-products of combustion or pyrolysis of tobacco, but rather, use of those preferred systems results in the production of vapors resulting from volatilization or vaporization of certain components incorporated therein. In preferred embodiments, components of aerosol delivery systems may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery systems may provide many of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases, and aerosols of a form or type suitable for human inhalation, whether or not visible, and whether or not of a form that might be considered to be smoke-like.

Aerosol delivery devices of the present disclosure generally include a number of components provided within an outer body or shell, which may be referred to as a housing. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary housing, or the elongated housing can be formed of two or more separable bodies. For example, an aerosol delivery device can comprise an elongated shell or body that can be substantially tubular in shape and, as such, resemble the shape of a conventional cigarette or cigar. In one embodiment, all of the components of the aerosol delivery device are contained within one housing. Alternatively, an aerosol delivery device can comprise two or more housings that are joined and are separable. For example, an aerosol delivery device can possess at one end a control body comprising a housing containing one or more components (e.g., a battery and various electronics for controlling the operation of that article), and at the other end and removably attached thereto an outer body or shell containing aerosol forming components (e.g., one or more aerosol precursor components, such as flavors and aerosol formers, one or more heaters, and/or one or more wicks).

Aerosol delivery devices of the present disclosure can be formed of an outer housing or shell that is not substantially tubular in shape but may be formed to substantially greater dimensions. The housing or shell can be configured to include a mouthpiece and/or may be configured to receive a separate shell (e.g., a cartridge) that can include consumable elements, such as a liquid aerosol former, and can include a vaporizer or atomizer.

Aerosol delivery devices of the present disclosure most preferably comprise some combination of a power source (i.e., an electrical power source), at least one control component (e.g., means for actuating, controlling, regulating and ceasing power for heat generation, such as by controlling electrical current flow the power source to other components of the article—e.g., a microcontroller or microprocessor), a heater or heat generation member (e.g., an electrical resistance heating element or other component, which alone or in combination with one or more further elements may be commonly referred to as an "atomizer"), an aerosol precursor composition (e.g., commonly a liquid capable of yielding an aerosol upon application of sufficient heat, such as ingredients commonly referred to as "smoke juice," "e-liquid" and "e-juice"), and a mouthpiece or mouth region for allowing draw upon the aerosol delivery device for aerosol inhalation (e.g., a defined airflow path through the article such that aerosol generated can be withdrawn therefrom upon draw).

More specific formats, configurations and arrangements of components within the aerosol delivery systems of the present disclosure will be evident in light of the further disclosure provided hereinafter. Additionally, the selection and arrangement of various aerosol delivery system components can be appreciated upon consideration of the commercially available electronic aerosol delivery devices, such as those representative products referenced in background art section of the present disclosure.

One example embodiment of an aerosol delivery device 100 illustrating components that may be utilized in an aerosol delivery device according to the present disclosure is provided in FIG. 1. As seen in the cut-away view illustrated therein, the aerosol delivery device 100 can comprise a control body 102 and a cartridge 104 that can be permanently or detachably aligned in a functioning relationship. Engagement of the control body 102 and the cartridge 104 can be press fit (as illustrated), threaded, interference fit, magnetic, or the like. In particular, connection components, such as further described herein may be used. For example, the control body may include a coupler that is adapted to engage a connector on the cartridge.

In specific embodiments, one or both of the control body 102 and the cartridge 104 may be referred to as being disposable or as being reusable. For example, the control body may have a replaceable battery or a rechargeable battery and thus may be combined with any type of recharging technology, including connection to a typical electrical outlet, connection to a car charger (i.e., cigarette lighter receptacle), and connection to a computer, such as through a universal serial bus (USB) cable. For example, an adaptor including a USB connector at one end and a control body connector at an opposing end is disclosed in U.S. Pat. Pub. No. 2014/0261495 to Novak et al., which is incorporated herein by reference in its entirety. Further, in some embodiments the cartridge may comprise a single-use cartridge, as disclosed in U.S. Pat. No. 8,910,639 to Chang et al., which is incorporated herein by reference in its entirety.

As illustrated in FIG. 1, a control body 102 can be formed of a control body shell 101 that can include a control component 106 (e.g., a printed circuit board (PCB), an integrated circuit, a memory component, a microcontroller, or the like), a flow sensor 108, a battery 110, and an LED 112, and such components can be variably aligned. Further indicators (e.g., a haptic feedback component, an audio feedback component, or the like) can be included in addition to or as an alternative to the LED. Additional representative types of components that yield visual cues or indicators, such as light emitting diode (LED) components, and the configurations and uses thereof, are described in U.S. Pat. No. 5,154,192 to Sprinkel et al.; U.S. Pat. No. 8,499,766 to Newton and U.S. Pat. No. 8,539,959 to Scatterday; and U.S. patent application Ser. No. 14/173,266, filed Feb. 5, 2014, to Sears et al.; which are incorporated herein by reference.

A cartridge 104 can be formed of a cartridge shell 103 enclosing the reservoir 144 that is in fluid communication with a liquid transport element 136 adapted to wick or otherwise transport an aerosol precursor composition stored in the reservoir housing to a heater 134. Various embodiments of materials configured to produce heat when electrical current is applied therethrough may be employed to form the resistive heating element 134. Example materials from which the wire coil may be formed include Kanthal (FeCrAl), Nichrome, Molybdenum disilicide ($MoSi_2$), molybdenum silicide (MoSi), Molybdenum disilicide doped with Aluminum ($Mo(Si,Al)_2$), graphite and graphite-based materials (e.g., carbon-based foams and yarns) and ceramics (e.g., positive or negative temperature coefficient ceramics). As further described herein, a heater may comprise a variety of materials configured to provide electromagnetic radiation, including laser diodes.

An opening 128 may be present in the cartridge shell 103 (e.g., at the mouthend) to allow for egress of formed aerosol from the cartridge 104. Such components are representative of the components that may be present in a cartridge and are not intended to limit the scope of cartridge components that are encompassed by the present disclosure.

The cartridge 104 also may include one or more electronic components 150, which may include an integrated circuit, a memory component, a sensor, or the like. The electronic component 150 may be adapted to communicate with the control component 106 and/or with an external device by wired or wireless means. The electronic component 150 may be positioned anywhere within the cartridge 104 or its base 140.

Although the control component 106 and the flow sensor 108 are illustrated separately, it is understood that the control component and the flow sensor may be combined as an electronic circuit board with the air flow sensor attached directly thereto. Further, the electronic circuit board may be positioned horizontally relative the illustration of FIG. 1 in that the electronic circuit board can be lengthwise parallel to the central axis of the control body. In some embodiments, the air flow sensor may comprise its own circuit board or other base element to which it can be attached. In some embodiments, a flexible circuit board may be utilized. A flexible circuit board may be configured into a variety of shapes, include substantially tubular shapes.

The control body 102 and the cartridge 104 may include components adapted to facilitate a fluid engagement therebetween. As illustrated in FIG. 1, the control body 102 can include a coupler 124 having a cavity 125 therein. The cartridge 104 can include a base 140 adapted to engage the coupler 124 and can include a projection 141 adapted to fit within the cavity 125. Such engagement can facilitate a stable connection between the control body 102 and the cartridge 104 as well as establish an electrical connection between the battery 110 and control component 106 in the control body and the heater 134 in the cartridge. Further, the control body shell 101 can include an air intake 118, which may be a notch in the shell where it connects to the coupler 124 that allows for passage of ambient air around the coupler and into the shell where it then passes through the cavity 125 of the coupler and into the cartridge through the projection 141.

A coupler and a base useful according to the present disclosure are described in U.S. Pat. Pub. No. 2014/0261495 to Novak et al., the disclosure of which is incorporated herein by reference in its entirety. For example, a coupler as seen in FIG. 1 may define an outer periphery 126 configured to mate with an inner periphery 142 of the base 140. In one embodiment the inner periphery of the base may define a radius that is substantially equal to, or slightly greater than, a radius of the outer periphery of the coupler. Further, the coupler 124 may define one or more protrusions 129 at the outer periphery 126 configured to engage one or more recesses 178 defined at the inner periphery of the base. However, various other embodiments of structures, shapes, and components may be employed to couple the base to the coupler. In some embodiments the connection between the base 140 of the cartridge 104 and the coupler 124 of the control body 102 may be substantially permanent, whereas in other embodiments the connection therebetween may be releasable such that, for example, the control body may be reused with one or more additional cartridges that may be disposable and/or refillable.

The aerosol delivery device 100 may be substantially rod-like or substantially tubular shaped or substantially cylindrically shaped in some embodiments. In other embodiments, further shapes and dimensions are encompassed—e.g., a rectangular or triangular cross-section, multifaceted shapes, or the like.

The reservoir 144 illustrated in FIG. 1 can be a container or can be a fibrous reservoir, as presently described. For example, the reservoir 144 can comprise one or more layers of nonwoven fibers substantially formed into the shape of a tube encircling the interior of the cartridge shell 103, in this embodiment. An aerosol precursor composition can be retained in the reservoir 144. Liquid components, for example, can be sorptively retained by the reservoir 144. The reservoir 144 can be in fluid connection with a liquid transport element 136. The liquid transport element 136 can transport the aerosol precursor composition stored in the reservoir 144 via capillary action to the heating element 134 that is in the form of a metal wire coil in this embodiment. As such, the heating element 134 is in a heating arrangement with the liquid transport element 136.

In use, when a user draws on the article 100, airflow is detected by the sensor 108, the heating element 134 is activated, and the components for the aerosol precursor composition are vaporized by the heating element 134. Drawing upon the mouthend of the article 100 causes ambient air to enter the air intake 118 and pass through the cavity 125 in the coupler 124 and the central opening in the projection 141 of the base 140. In the cartridge 104, the drawn air combines with the formed vapor to form an aerosol. The aerosol is whisked, aspirated, or otherwise drawn away from the heating element 134 and out the mouth opening 128 in the mouthend of the article 100.

An input element may be included with the aerosol delivery device. The input may be included to allow a user to control functions of the device and/or for output of information to a user. Any component or combination of components may be utilized as an input for controlling the function of the device. For example, one or more pushbuttons may be used as described in U.S. patent application Ser. No. 14/193,961, filed Feb. 28, 2014, to Worm et al., which is incorporated herein by reference. Likewise, a touchscreen may be used as described in U.S. patent application Ser. No. 14/643,626, filed Mar. 10, 2015, to Sears et al., which is incorporated herein by reference. As a further example, components adapted for gesture recognition based on specified movements of the aerosol delivery device may be used as an input. See U.S. patent application Ser. No. 14/565,137, filed Dec. 9, 2014, to Henry et al., which is incorporated herein by reference.

In some embodiments, an input may comprise a computer or computing device, such as a smartphone or tablet. In particular, the aerosol delivery device may be wired to the computer or other device, such as via use of a USB cord or similar protocol. The aerosol delivery device also may communicate with a computer or other device acting as an input via wireless communication. See, for example, the systems and methods for controlling a device via a read request as described in U.S. patent application Ser. No. 14/327,776, filed Jul. 10, 2014, to Ampolini et al., the disclosure of which is incorporated herein by reference. In such embodiments, an APP or other computer program may be used in connection with a computer or other computing device to input control instructions to the aerosol delivery device, such control instructions including, for example, the ability to form an aerosol of specific composition by choosing the nicotine content and/or content of further flavors to be included.

The various components of an aerosol delivery device according to the present disclosure can be chosen from components described in the art and commercially available. Examples of batteries that can be used according to the disclosure are described in U.S. Pat. Pub. No. 2010/0028766 to Peckerar et al., the disclosure of which is incorporated herein by reference in its entirety.

The aerosol delivery device can incorporate a sensor or detector for control of supply of electric power to the heat generation element when aerosol generation is desired (e.g., upon draw during use). As such, for example, there is provided a manner or method for turning off the power supply to the heat generation element when the aerosol delivery device is not be drawn upon during use, and for turning on the power supply to actuate or trigger the generation of heat by the heat generation element during draw. Additional representative types of sensing or detection mechanisms, structure and configuration thereof, components thereof, and general methods of operation thereof, are described in U.S. Pat. No. 5,261,424 to Sprinkel, Jr.; U.S. Pat. No. 5,372,148 to McCafferty et al.; and PCT WO 2010/003480 to Flick; which are incorporated herein by reference.

The aerosol delivery device most preferably incorporates a control mechanism for controlling the amount of electric power to the heat generation element during draw. Representative types of electronic components, structure and configuration thereof, features thereof, and general methods of operation thereof, are described in U.S. Pat. No. 4,735,217 to Gerth et al.; U.S. Pat. No. 4,947,874 to Brooks et al.; U.S. Pat. No. 5,372,148 to McCafferty et al.; U.S. Pat. No. 6,040,560 to Fleischhauer et al.; U.S. Pat. No. 7,040,314 to Nguyen et al. and U.S. Pat. No. 8,205,622 to Pan; U.S. Pat. Pub. Nos. 2009/0230117 to Fernando et al., 2014/0060554 to Collet et al., and 2014/0270727 to Ampolini et al.; and U.S. patent application Ser. No. 14/209,191, filed Mar. 13, 2014, to Henry et al.; which are incorporated herein by reference.

Representative types of substrates, reservoirs or other components for supporting the aerosol precursor are described in U.S. Pat. No. 8,528,569 to Newton; U.S. Pat. Pub. Nos. 2014/0261487 to Chapman et al. and 2014/0059780 to Davis et al.; and U.S. patent application Ser. No. 14/170,838, filed Feb. 3, 2014, to Bless et al.; which are incorporated herein by reference. Additionally, various wicking materials, and the configuration and operation of those wicking materials within certain types of electronic cigarettes, are set forth in U.S. Pat. No. 8,910,640 to Sears et al.; which is incorporated herein by reference.

For aerosol delivery systems that are characterized as electronic cigarettes, the aerosol precursor composition most preferably incorporates tobacco or components derived from tobacco. In one regard, the tobacco may be provided as parts or pieces of tobacco, such as finely ground, milled or powdered tobacco lamina. In another regard, the tobacco may be provided in the form of an extract, such as a spray dried extract that incorporates many of the water soluble components of tobacco. Alternatively, tobacco extracts may have the form of relatively high nicotine content extracts, which extracts also incorporate minor amounts of other extracted components derived from tobacco. In another regard, components derived from tobacco may be provided in a relatively pure form, such as certain flavoring agents that are derived from tobacco. In one regard, a component that is derived from tobacco, and that may be employed in a highly purified or essentially pure form, is nicotine (e.g., pharmaceutical grade nicotine).

The aerosol precursor composition, also referred to as a vapor precursor composition, may comprise a variety of components including, by way of example, a polyhydric alcohol (e.g., glycerin, propylene glycol, or a mixture thereof), nicotine, tobacco, tobacco extract, and/or flavorants. Representative types of aerosol precursor components and formulations also are set forth and characterized in U.S. Pat. No. 7,726,320 to Robinson et al. and U.S. Pat. Pub. Nos. 2013/0008457 to Zheng et al.; 2013/0213417 to Chong et al.; 2014/0060554 to Collett et al.; 2015/0020823 to Lipowicz et al.; and 2015/0020830 to Koller, as well as WO 2014/182736 to Bowen et al, the disclosures of which are incorporated herein by reference. Other aerosol precursors that may be employed include the aerosol precursors that have been incorporated in the VUSE® product by R. J. Reynolds Vapor Company, the BLU™ product by Lorillard Technologies, the MISTIC MENTHOL product by Mistic Ecigs, and the VYPE product by CN Creative Ltd. Also desirable are the so-called "smoke juices" for electronic cigarettes that have been available from Johnson Creek Enterprises LLC.

The amount of aerosol precursor that is incorporated within the aerosol delivery system is such that the aerosol generating piece provides acceptable sensory and desirable performance characteristics. For example, it is highly preferred that sufficient amounts of aerosol forming material (e.g., glycerin and/or propylene glycol), be employed in order to provide for the generation of a visible mainstream aerosol that in many regards resembles the appearance of tobacco smoke. The amount of aerosol precursor within the aerosol generating system may be dependent upon factors such as the number of puffs desired per aerosol generating piece. Typically, the amount of aerosol precursor incorporated within the aerosol delivery system, and particularly within the aerosol generating piece, is less than about 2 g, generally less than about 1.5 g, often less than about 1 g and frequently less than about 0.5 g.

Yet other features, controls or components that can be incorporated into aerosol delivery systems of the present disclosure are described in U.S. Pat. No. 5,967,148 to Harris et al.; U.S. Pat. No. 5,934,289 to Watkins et al.; U.S. Pat. No. 5,954,979 to Counts et al.; U.S. Pat. No. 6,040,560 to Fleischhauer et al.; U.S. Pat. No. 8,365,742 to Hon; U.S. Pat. No. 8,402,976 to Fernando et al.; U.S. Pat. Pub. Nos. 2010/0163063 to Fernando et al.; 2013/0192623 to Tucker et al.; 2013/0298905 to Leven et al.; 2013/0180553 to Kim et al., 2014/0000638 to Sebastian et al., 2014/0261495 to Novak et al., and 2014/0261408 to DePiano et al.; which are incorporated herein by reference.

The foregoing description of use of the article can be applied to the various embodiments described herein through minor modifications, which can be apparent to the person of skill in the art in light of the further disclosure provided herein. The above description of use, however, is not intended to limit the use of the article but is provided to comply with all necessary requirements of disclosure of the present disclosure. Any of the elements shown in the article illustrated in FIG. 1 or as otherwise described above may be included in an aerosol delivery device according to the present disclosure.

In some embodiments, the present disclosure particularly can relate to atomizers and elements thereof that may be utilized in an aerosol delivery device. Such atomizers and elements thereof can be particularly beneficial for improved energy efficiency in an aerosol delivery device. For example, energy drain associated with achieving the desired heating temperature between puffs on a device can be minimized. More particularly, the atomizers and associated elements can achieve the desired heating temperature more rapidly and/or reduce heat losses that may hinder vaporization.

In some embodiments, the heater used in an atomizer can be a source of electromagnetic radiation. In particular, the heater can be configured to emit electromagnetic radiation of a specific wavelength or a specific range of wavelengths (i.e., a defined band). For example, the heater can be configured to emit electromagnetic radiation having a wavelength that is within the range that encompasses violet light to far infrared light. More particularly, the wavelength can be within the range of about 390 nm to about 1 mm. As another example, the wavelength can be within the range that encompasses visible light (i.e., about 400 nm to about 700 nm).

The radiation source may be configured to emit radiation with a focused band, and such focused band may be chosen based upon the substrate to be heated so as to maximize the heating of the specific substrate(s). For example, the radiation source can be configured to emit electromagnetic radiation within a wavelength band having a bandwidth that is no greater than 100 μm, that is no greater than 10 μm, no greater than 1,000 nm, that is no greater than 500 nm, that is no greater than 250 nm, that is no greater than 100 nm, that is no greater than 50 nm, that is no greater than 10 nm, that is no greater than 5 nm, or that is no greater than 2 nm. More particularly, the radiation source can be configured to emit electromagnetic radiation within a range corresponding to a particular absorption wavelength of a wick material, of an aerosol precursor composition, and/or of one or more specific components of an aerosol precursor composition. As a non-limiting example, many polyols that may be used in an aerosol precursor composition can exhibit preferential absorption in a wavelength band of about 2 μm to about 12 μm. Thus, a heater according to the present disclosure may be configured to emit electromagnetic radiation within a wavelength band that is no greater than 10 μm (i.e., having specific wavelengths in the range of 2 μm to 12 μm). Other ranges, however, are encompassed. For example a wavelength band of about 700 nm to about 1 mm may be beneficial for specific absorbance of electromagnetic energy of visible by a material that is visibly clear but is opaque in relation to infrared light. As yet a further example, a wavelength band of about 390 nm to about 790 nm may be beneficial for specific absorbance by a substrate that is visibly black.

In some embodiments, a laser diode may be used as the heater. Utilization of radiation of a specific wavelength or very narrow band (such as is common in a laser) can focus the energy spectrally so that less energy is spread out to various wavelengths. Radiation wavelength also can be more specifically tuned to a specific absorption wavelength (or band) of a substrate, such as an aerosol precursor composition or component thereof and/or a wick from which the aerosol precursor composition may be vaporized. Use of a laser-based radiation source also can be advantageous for focusing the radiation energy into a smaller space-domain to minimize radiation losses.

An atomizer according to the present disclosure can be defined in some embodiments by a chamber within which the radiation is emitted and from which vaporized aerosol precursor composition may be released. When a laser radiation source in particular is utilized, the chamber may be reduced in size because of the ability to focus the radiation energy and avoid energy losses. Thus, the desired amount of vapor may be produced from a smaller volume since less energy is wasted. In some embodiments, a laser radiation source can provide direct heating of an aerosol precursor composition. For example, a device may be configured such that aerosol precursor composition is delivered (including via wicking) to a specific location (i.e., a vaporization target) within a chamber, and one or more laser radiation sources can be focused directly at the specific location. In this manner, less radiation is available for scattering within the chamber, but a majority of the radiation directly strikes the vaporization target. In embodiments wherein the laser radiation band is focused to a preferred absorption wavelength of the target (i.e., the target substrate and/or the aerosol precursor material), such focused heating may be particularly beneficial for increasing vapor formation while reducing energy requirements.

The chamber may take on a variety of shapes. For example, the chamber may be substantially spherical. Multifaceted structures may also be utilized. In some embodiments, the chamber may be substantially elongated (e.g., tubular). Chamber shape (optionally in combination with the airflow path through and/or around the chamber) can enhance not only the energy absorption but also vapor elution.

The chamber can, in some embodiments, be a radiation-trapping chamber. The chamber preferentially is configured to maximize the capture and/or release of incident radiation on the chamber walls. As such, the interior of the wall(s) forming the chamber can be configured to one or more of absorb, emit, and reflect radiation from the radiation source. For example: the interior of the chamber wall(s) may be configured to absorb at least about 50%, at least about 60%, at least about 70%, or at least about 80% of all incident electromagnetic radiation; the interior of the chamber wall (s) may be configured to reflect at least about 50%, at least about 60%, at least about 70%, or at least about 80% of all incident electromagnetic radiation.

In some embodiments, the interior of the chamber wall can be configured as a black body. In other words, the black body construction can indicate that substantially all of the incident electromagnetic radiation is absorbed, regardless of frequency or angle of incidence. The ability of the black body construction to absorb substantially all of the incident electromagnetic radiation can mean that at least 98%, at least 99%, at least 99.5%, or at least 99.9% of all incident electromagnetic radiation is absorbed. The black body construction further can indicate that it is an ideal emitter (i.e., at every frequency, it emits as much (or more) energy as any other body at the same temperature) and/or that it is a diffuse emitter (i.e., the energy is radiated isotropically, independent of direction). A black body in thermal equilibrium can emit electromagnetic radiation—i.e., black-body radiation. Such radiation is emitted having a spectrum that is determined by temperature and not by the shape or composition of the black body structure. A radiation-trapping chamber thus may be constructed of a material having an emissivity that is close to 1. For example, emissivity of a radiation trapping chamber configured substantially as a black body can be greater than 0.5, greater than 0.6, greater than 0.7, greater than 0.8, or greater than 0.9, such as, for example, in the range of about 0.6 to about 0.99, about 0.7 to about 0.98, or about 0.75 to about 0.95.

In other embodiments, the interior of the chamber wall can be configured as a white body. In other words, the interior of the chamber wall can be configured to reflect substantially all incident electromagnetic radiation completely and uniformly in all directions. The ability to reflect substantially all incident electromagnetic radiation can mean that at least 98%, at least 99%, at least 99.5%, or at least 99.9% of all incident electromagnetic radiation is reflected. Emissivity of a radiation trapping chamber configured substantially as a white body can be less than 0.5, less than 0.4, less than 0.3, less than 0.2, or less than 0.1, such as, for example, in the range of about 0.01 to about 0.4, about 0.02 to about 0.3, or about 0.05 to about 0.25.

A radiation trapping chamber may be formed of any material that is sufficiently heat stable at the temperatures achieved within the chamber. The radiation-trapping chamber particularly may include an out, insulating layer so as to substantially prevent or reduce radiation of heat away from the chamber. As non-limiting examples, materials that may be useful in forming a radiation-trapping chamber can include ceramics and silicon-based materials. In some embodiments, a double-walled chamber may be utilized such that an insulating material (including air) may be present between the walls.

The radiation source utilized as the heater can be configured to provide radiation within the chamber, particularly a radiation-trapping chamber. In some embodiments, the radiation source may be positioned on the wall of the chamber (i.e., attached directly thereto or incorporated therein) so as to emit the radiation directly within the chamber. In other embodiments, the radiation source can be positioned within the chamber and spaced apart from the chamber wall. For example, one or more struts or supports may extend through or from the chamber wall so that the radiation source is substantially suspended within the chamber. The radiation source may be substantially centered within the chamber or may be off-set from the approximate center of the chamber. In some embodiments, the radiation source can extend substantially along a longitudinal axis through the chamber and/or through the shell of the device in which the chamber and radiation source are positioned.

The chamber can include at least one opening (or outlet) through which formed vapor may escape or be expelled. The chamber also can include an inlet into which air or another gas may pass so as to entrain or co-mingle with formed vapor and exit through the outlet. In particular, the inlet and the outlet can be in fluid communication. The chamber may include one or more further openings, apertures, or the like through which additional elements of an atomizer and/or aerosol delivery device may pass. The further openings may also allow for influx of air. Alternatively, the further openings may be substantially sealed. In some embodiments, for example, a wick or like liquid transport element may pass through one or more openings into and/or out of the chamber. Electrical contact further may pass through the chamber wall into the chamber for providing power to a heater that may be positioned therein.

Exemplary chamber configurations are illustrated in FIG. 2*a* through FIG. 2*d*. In the exemplary embodiment of FIG. 2*a*, an atomizer 201 comprises a chamber 203 (preferably a radiation-trapping chamber) that is substantially spherical (although other shapes are also encompassed). The chamber 203 is illustrated partially transparent for ease of description thereof. The chamber 203 is formed of a chamber wall 205 with an interior surface 205*a* and an exterior surface 205*b*. The interior surface 205*a*, for example, may be configured as a black body or a white body as otherwise described herein so as to enable configuration as a radiation-trapping chamber. An inlet 207 and an outlet 209 are spaced apart so as to be substantially opposing; however, other configurations may be utilized to optimize movement of formed vapor out of the chamber 203. The positions of the inlet 207 and outlet 209 may be reversed. The chamber 203 also includes apertures 211 through which a wick (not illustrated) may be inserted. Although two apertures 211 are illustrated, only a single aperture may be used, or more than two apertures may be used (i.e., for insertion of multiple wicks). Laser diodes 215 are also present and are positioned in the wall 205 of the chamber 203 so as to emit electromagnetic radiation into the interior 203*a* of the chamber 203.

A cross-section of the atomizer 201 from FIG. 2*a* is shown in FIG. 2*b*. In FIG. 2*b*, a wick 212 is shown passing through the apertures 211 so that a portion of the wick is interior to the chamber 203 and a portion of the wick is exterior to the chamber. In use, the wick 212 can transport an aerosol precursor composition to the interior 203*a* of the chamber 203 so that electromagnetic radiation from the laser diode 215 can be utilized to vaporize the aerosol precursor composition to pass out of the chamber, particularly combined with air entering the chamber through the inlet 207, through the outlet 209 (e.g., as an aerosol).

A further exemplary embodiment of an atomizer 201 is shown in FIG. 2*c* and FIG. 2*d*. Again, a substantially spherical chamber 203 is formed of a chamber wall 205 having an interior surface 205*a* and an exterior surface 205*b*, and laser diodes 215 are positioned in the chamber wall along with an inlet 207 and an outlet 209. In this embodiment, the wick 212 is present substantially in the form of a sheet that is lining the interior surface 205*a* of the chamber wall 205. The wick 212, in particular, is in a curved, planar form. The chamber 203 also includes a channel 213 passing therethrough from the interior of the chamber to the exterior of the chamber. In the illustrated embodiment, the channel 213 is substantially at the “equator” of the sphere and extends around the entire circumference thereof so as to essentially divide the chamber 203 into two hemispheres. A wick extension 214 protrudes through the channel 213 so as to be in fluid communication with the exterior environment surrounding the chamber 203. As further illustrated herein, the wick extension 214 may contact a reservoir to cause transport of the aerosol precursor composition therefrom into the interior of the chamber 203 to “wet” the wick lining. Electromagnetic radiation from the laser diodes 215 may penetrate the wick lining 212 to facilitate the radiation-trapping effect described herein and vaporize the aerosol precursor composition in the wick.

As further described below, the chamber can take on other configurations. For example, the chamber may be substantially elongated. Likewise, the electromagnetic radiation source can take on further configurations. For example, a heating wire may be used.

An aerosol delivery device 350 including a chamber 303 and an electromagnetic radiation source 315 is shown in FIG. 3. In the illustrated embodiment, the chamber 303 is again substantially spherical; however, other chamber configurations are also encompassed, as described in greater detail below. The aerosol delivery device 350 comprises an outer shell 320 in which further portions of the device are positioned. The chamber 303 comprises a chamber wall 305 with an interior surface 305*a* and an exterior surface 305*b*. Laser diodes 315 are positioned in the chamber wall 305 and configured to emit radiation within the chamber 303. The interior surface 305*a* of the chamber wall 305 is configured to trap emitted radiation as otherwise described herein. A wick 312 is positioned such that a portion of the wick is interior to the chamber 303 and a portion of the wick is exterior to the chamber. In particular one or more wick arm(s) 312*a* are exterior to the chamber 303 and are in contact with a reservoir 330 which, as illustrated, is a porous substrate, such as a fibrous mat (although other reservoir configurations and materials are also encompassed). The reservoir 330, as illustrated, wraps around the interior of the outer shell 320. Contact between the wick 312 and the reservoir 330 is sufficient such that an aerosol precursor composition held by the reservoir may pass to the wick for transport to the chamber 303.

The chamber 303 includes an inlet 307 through which air may enter and an outlet 309 through which formed aerosol may exit. The aerosol delivery device 350 comprises an air entry 352 and an aerosol port 354 at opposing ends thereof. Air passing into the aerosol delivery device 350 through the air entry 352 is directed to the inlet 307 of the chamber by an air passage 353*a* defined by an air passage wall 353*b* that extends between the air entry and the inlet 307. In the illustrated embodiment, the air passage wall 353*b* is configured such that the air passage 353*a* is substantially conical so as taper toward the inlet 307 of the chamber 303 and improve focusing of the incoming air into the chamber.

While such configuration may be preferred, it is not required, and other configurations (including absence of the air passage wall 353*b*) are included. Similarly, aerosol formed in the chamber 303 through mixing of the air and vaporized aerosol precursor composition passes through the outlet 309 to the aerosol port 354. An aerosol passage 355*a* is defined by an aerosol passage wall 355*b* that extends between the outlet 309 and the aerosol port 354. As illustrated, the aerosol passage is substantially linear; however, other embodiments are also encompassed. The aerosol port 354 is positioned at a mouth end 360 of the aerosol delivery device 350, and the aerosol port 354 may particularly be defined in a mouth end cap 361.

The aerosol delivery device 350 is shown in FIG. 3 relative to its x axis, y axis, and z axis. To further illustrate the device 350, FIG. 3*a* shows a cross-section thereof through the xy plane, and FIG. 3*b* shows a cross-section thereof through the xz plane.

A further example embodiment of an aerosol delivery device 450 is shown in FIG. 4. The aerosol delivery device 450 again includes a chamber 403 and an electromagnetic radiation source 415. In the illustrated embodiment, the chamber 403 is again substantially spherical; however, other chamber configurations are also encompassed. The aerosol delivery device 450 comprises an outer shell 420 in which further portions of the device are positioned. The chamber 403 comprises a chamber wall 405 with an interior surface (which is obscured in the illustration by the wick 412 that substantially lines the interior of the chamber wall) and an exterior surface 405*b*. Laser diodes 415 are positioned in the chamber wall 405 and configured to emit radiation within the chamber 403. A wick 412 is present in substantially the form of a sheet lining the interior surface of the chamber wall 405. The chamber 403 is formed so as to include a channel 413 passing through the wall 405 thereof from the interior of the chamber to the exterior of the chamber. In the illustrated embodiment, the channel 413 is substantially at the "equator" of the sphere and extends around the entire circumference thereof so as to essentially divide the chamber 403 into two hemispheres. A wick extension 414 protrudes through the channel 413 so as to be in fluid communication with the exterior environment surrounding the chamber 403. In particular, the wick extension 414 is in fluid connection with the reservoir 430 in which the aerosol precursor composition is stored. Contact between the wick 414 and the reservoir 430 is sufficient such that the aerosol precursor composition held by the reservoir may pass via the wick extension 414 to the wick 412 for distribution around the interior of the chamber 403. The interior surface of the chamber wall 405 is configured to trap emitted radiation as otherwise described herein. Preferably, the structure of the wick 412 is configured so that radiation may pass therethrough for interaction with the interior surface of the chamber wall 405.

In FIG. 4, the chamber 403 includes an inlet 407 through which air may enter and an outlet 409 through which formed aerosol may exit. The aerosol delivery device 450 comprises an air entry 452 and an aerosol port 454 at opposing ends thereof. Air passing into the aerosol delivery device 450 through the air entry 452 is directed to the inlet 407 of the chamber 403 by an air passage 453*a* defined by an air passage wall 453*b* that extends between the air entry and the inlet 307. Aerosol formed in the chamber 403 passes through the outlet 409 to the aerosol port 454. An aerosol passage 455*a* is defined by an aerosol passage wall 455*b* that extends between the outlet 409 and the aerosol port 454. The aerosol port 454 is positioned at a mouth end 460 of the aerosol delivery device 450, and the aerosol port may particularly be defined in a mouth end cap 461.

Another example embodiment of an aerosol delivery device 550 is shown in FIG. 5. The aerosol delivery device 550 includes a chamber 503 that is elongated (i.e., substantially tubular) and includes an electromagnetic radiation source 515 positioned within the chamber. In the illustrated embodiment, the electromagnetic radiation source 515 is a coiled wire that can provide resistive heating; however, the wire may be provided in different configurations, and other types of electromagnetic radiation sources may be used. The electromagnetic radiation source 515 has respective ends that are connected to electrical connectors 516 that provide electrical connection to a power source.

The aerosol delivery device 550 comprises an outer shell 520 in which further portions of the device are positioned. The chamber 503 comprises a chamber wall 505 with an interior surface (which is obscured in the illustration by the wick 512 that substantially lines the interior of the chamber wall) and an exterior surface 505*b*. A wick 512 is present in substantially the form of a sheet lining the interior surface of the chamber wall 505. The chamber 503 is formed so as to include a channel 513 passing through the wall 505 thereof from the interior of the chamber to the exterior of the chamber. See particularly the cross-section in FIG. 5*a* through the yz plane at approximately a longitudinal midpoint of the chamber 503. The channel 513 may pass through the chamber wall 505 at any location and is not limited to the two locations illustrated in FIG. 5*a*. A wick extension 514 protrudes through the channel 513 so as to be in fluid communication with the exterior environment surrounding the chamber 503. In particular, the wick extension 514 is in fluid connection with the reservoir 530 in which the aerosol precursor composition is stored. Contact between the wick 514 and the reservoir 530 is sufficient such that the aerosol precursor composition held by the reservoir may pass via the wick extension 514 to the wick 512 for distribution around the interior of the chamber 503. The interior surface of the chamber wall 505 is configured to trap emitted radiation as otherwise described herein. Preferably, the structure of the wick 512 is configured so that radiation may pass therethrough for interaction with the interior surface of the chamber wall 505.

In FIG. 5, the elongated chamber 503 includes an inlet 507 through which air may enter and an outlet 509 through which formed aerosol may exit. The aerosol delivery device 550 comprises an air entry 552 and an aerosol port 554 at opposing ends thereof. Air passing into the aerosol delivery device 550 through the air entry 552 is directed to the inlet 507 of the chamber 503 by an air passage 553*a* defined by an air passage wall 553*b* that extends between the air entry and the inlet 507. Aerosol formed in the chamber 503 passes through the outlet 509 to the aerosol port 554. An aerosol passage 555*a* is defined by an aerosol passage wall 555*b* that extends between the outlet 509 and the aerosol port 554. The aerosol port 554 is positioned at a mouth end 560 of the aerosol delivery device 550, and the aerosol port may particularly be defined in a mouth end cap 561. In this embodiment, the heater is aligned substantially parallel to the longitudinal axis of the aerosol delivery device.

In some embodiments, heating of the wick in the chamber is carried out in the absence of any direct physical contact between the wick and a heater. As such, heating may be substantially or completely radiative.

The ability to achieve sufficient heating levels through radiative heating alone has been verified with computer models of heat flow within a substantially tube-shaped chamber (see, for example, FIG. 5) and a heating rod substantially centrally located within the tube. The heating rod reaching temperatures up to 1,200° C. resulted in radiative heating of the chamber walls within the range of 125° C. to 350° C. Such model indicated that radiative heating alone can achieve suitable temperatures for vaporization of typical aerosol precursor materials as discussed herein. More particularly, in some embodiments, radiative heating can be sufficient to heat a substrate (e.g., a wick) and/or an aerosol precursor material to a temperature of about 100° C. to about 400° C., about 125° C. to about 350° C., or about 150° C. to about 300° C. In some embodiments, radiative heating can be in a range that is above the vaporization temperature of a liquid aerosol precursor material but less than 300° C., less than 250° C., or less than 200° C.

In particular embodiments, heating may be carried out using a combination of thermal conduction (i.e., direct contact of a heating source and a wick) as well as radiative heating. Utilizing combination heating can particularly be useful for improving efficiency. When utilizing thermal conduction alone, while a portion of the heat from the heat source is conducted to the wick, a significant portion of the heat radiates away from the heat source. As such, the heat source may need to be heated to a greater temperature to sufficiently overcome the radiative heat losses and still heat the wick to the required vapor forming temperature. By enclosing a conductive heating construct in a radiation trapping chamber, however, the heat that radiates away from the heat source may be directed back to the wick. As such, less power may be required to achieve the required vapor forming temperature.

For example, as illustrated in FIG. 6, an aerosol delivery device 650 can be configured such that a heater 615 in the form of a heating wire is positioned within a chamber 603 and is wrapped around a wick 612 having a portion within the chamber and having wick arms 612*a* that are exterior to the chamber. The wick arms 612*a* are in fluid connection with the reservoir 630 so that aerosol precursor composition stored in the reservoir may pass through the wick into the chamber 603 where the aerosol precursor composition is heated and vaporized through conductive heating by being in direct contact with the heater 615 and through radiative heating by receiving the additional heat that radiates away from the heater but is returned to the wick because of the nature of the interior surface 605*a* of the wall 605 of the chamber 603.

In the embodiment illustrated in FIG. 6, the aerosol delivery device 650 includes an outer shell 620, an air entry 652 and an aerosol port 654. The air entry 652 is positioned at a connecting end 656 of the aerosol delivery device 650, which may be configured for connection to a control body (see FIG. 1). The aerosol port 654 is positioned at a mouth end 660 of the aerosol delivery device 650 and is particularly formed in a mouth end cap 661. Air passing into the aerosol delivery device 650 through the air entry 652 is directed to the inlet 607 of the chamber 603 by an air passage 653*a* defined by an air passage wall 653*b* that extends between the air entry and the inlet. Aerosol formed in the chamber 603 passes through the outlet 609 to the aerosol port 654. An aerosol passage 655*a* is defined by an aerosol passage wall 655*b* that extends between the outlet 609 and the aerosol port 654. In this embodiment, the wick portion within the chamber and the heater are aligned substantially perpendicular to the longitudinal axis of the aerosol delivery device.

In some embodiments, the present disclosure further can provide for methods of preparing an aerosol delivery device.

Such methods can include combining an outer shell with a radiation-trapping chamber and/or combining an outer shell with a laser diode.

In certain embodiments, a method of assembling an aerosol delivery device can comprise at least the step of inserting a radiation-trapping chamber into an outer shell. The assembly method further can comprise one or more of the following steps:

- combining a heater with the radiation-trapping chamber so that the heater is configured for providing electromagnetic radiation within the chamber;
- establishing an electrical connection between the heater and one or more electrical connectors in step such that the power may be delivered from a power source to the heater;
- inserting a wick into the chamber;
- placing a reservoir into the outer shell such that the wick is in fluid connection with the reservoir; and
- adding an end cap to a mouth end of the outer shell such that the mouth end is configured for exit of aerosol from the aerosol delivery device.

In such methods, the wick may be inserted into the chamber before or after the chamber is combined with the heater and/or before or after the chamber is inserted into the outer shell. Moreover, the reservoir may be placed into the outer shell before or after inserting the chamber into the outer shell.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An aerosol delivery device comprising:

an outer shell;

a reservoir configured for storage of an aerosol precursor composition;

a chamber defined by a chamber wall that is separated from the reservoir;

a liquid transport element arranged for transport of the aerosol precursor composition from the reservoir to at least the chamber wall; and a radiation emitter configured to provide radiation within the chamber that vaporizes the aerosol precursor composition, without combustion, in the absence of direct contact between the radiation emitter and the liquid transport element, wherein the radiation emitter is configured to emit radiation within a focused wavelength band.

2. The aerosol delivery device according to claim 1, wherein an interior of the chamber wall is configured to reflect the radiation from the radiation emitter.

3. The aerosol delivery device according to claim 1, wherein the chamber wall is configured to allow air into the chamber and allow vapor out of the chamber while trapping radiation from the radiation emitter within the chamber.

4. The aerosol delivery device according to claim 1, wherein the radiation emitter is configured to emit radiation within a range corresponding to an absorption wavelength of the aerosol precursor composition.

5. The aerosol delivery device according to claim 1, wherein the radiation emitter is configured to emit radiation within a range corresponding to an absorption wavelength of one or more components of the aerosol precursor composition.

6. The aerosol delivery device according to claim 1, wherein the liquid transport element defines a portion of the chamber wall.

7. The aerosol delivery device according to claim 6, wherein the liquid transport element and the chamber wall are arranged relative to one another so that transport of the aerosol precursor composition from the reservoir is effective to wet at least the portion of the chamber wall defined by the liquid transport element.

8. The aerosol delivery device according to claim 1, wherein the liquid transport element lines at least a portion of the chamber wall.

9. The aerosol delivery device according to claim 1, wherein the liquid transport element at the chamber wall is planar.

10. The aerosol delivery device according to claim 1, wherein the liquid transport element extends from the chamber wall to the reservoir.

11. The aerosol delivery device according to claim 1, wherein the outer shell comprises an air entry and comprises a mouthend with an aerosol port.

12. The aerosol delivery device according to claim 1, wherein the device comprises a power source.

13. The aerosol delivery device according to claim 12, wherein the device comprises a component effective for regulating power delivered to the radiation emitter.

14. The aerosol delivery device according to claim 12, wherein the device comprises a microcontroller or microprocessor.

15. The aerosol delivery device according to claim 14, wherein one or both of the power source and the microcontroller are positioned within a control housing that is connectable with the outer shell.

16. The aerosol delivery device according to claim 1, wherein the chamber is not elongated.

17. The aerosol delivery device according to claim 1, wherein the chamber is not tubular.

18. The aerosol delivery device according to claim 1, wherein the chamber defines a multifaceted shape.

19. An aerosol delivery device comprising:

an outer shell;

a reservoir in which an aerosol precursor composition is stored; and an atomizer unit comprising:

a chamber defined by a chamber wall;

a liquid transport element arranged for transport of the aerosol precursor composition from the reservoir to at least the chamber wall; and a heater configured to emit electromagnetic radiation within a focused wavelength band corresponding to an absorption wavelength band of the aerosol precursor composition or an absorption wavelength band of the liquid transport element, wherein the atomizer unit is separated from the reservoir.

20. The aerosol delivery device according to claim 19, wherein the heater is configured to emit electromagnetic radiation within a focused wavelength band corresponding to an absorption wavelength band of a component of the aerosol precursor composition.

21. The aerosol delivery device according to claim 19, wherein the heater is a laser.

22. The aerosol delivery device according to claim 19, wherein the chamber is not elongated.

23. The aerosol delivery device according to claim 19, wherein the chamber is not tubular.

24. The aerosol delivery device according to claim 19, wherein the chamber defines a multifaceted shape.

25. The aerosol delivery device according to claim 19, wherein the device comprises a power source.

26. The aerosol delivery device according to claim 25, wherein the device comprises a component effective for regulating power delivered to the heater.

27. The aerosol delivery device according to claim 25, wherein the device comprises a microcontroller or microprocessor.

28. The aerosol delivery device according to claim 27, wherein one or both of the power source and the microcontroller are positioned within a control housing that is connectable with the outer shell.

29. The aerosol delivery device according to claim 19, wherein the chamber wall comprises at least one aperture.

30. The aerosol delivery device according to claim 29, wherein the liquid transport element passes through the aperture in the chamber wall.

* * * * *